United States Patent
Begis

(12) United States Patent     (10) Patent No.: US 7,000,018 B1
Begis     (45) Date of Patent: Feb. 14, 2006

(54) VOICE DATA STREAMING CONTROL IN A NETWORK

(75) Inventor: Glenn D. Begis, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/470,292

(22) Filed: Dec. 22, 1999

(51) Int. Cl.
G06F 15/16 (2006.01)

(52) U.S. Cl. .................. 709/227; 709/204; 709/205; 709/228; 709/231; 379/202.01; 379/201.01

(58) Field of Classification Search ............. 709/231, 709/217, 228, 204, 205, 227; 712/43; 370/352; 379/202.01, 201.01
See application file for complete search history.

(56) References Cited

U.S. PATENT DOCUMENTS

| | | | | |
|---|---|---|---|---|
| 5,526,353 A * | 6/1996 | Henley et al. | .............. | 370/392 |
| 5,528,739 A * | 6/1996 | Lucas et al. | ................ | 395/145 |
| 5,799,320 A * | 8/1998 | Klug | ........................... | 707/201 |
| 6,078,581 A * | 6/2000 | Shtivelman et al. | ......... | 370/352 |
| 6,167,033 A * | 12/2000 | Chang et al. | ................ | 370/263 |
| 6,195,357 B1 * | 2/2001 | Polcyn | ....................... | 370/401 |
| 6,363,349 B1 * | 3/2002 | Urs et al. | .................... | 704/275 |
| 6,404,873 B1 * | 6/2002 | Beyda et al. | ............. | 379/202.1 |
| 6,411,684 B1 * | 6/2002 | Cohn et al. | .............. | 379/88.14 |
| 6,418,199 B1 * | 7/2002 | Perrone | ................. | 379/88.01 |
| 6,430,175 B1 * | 8/2002 | Echols | ........................ | 370/352 |
| 6,434,643 B1 * | 8/2002 | Ejiri | ............................ | 710/58 |

* cited by examiner

Primary Examiner—Saleh Najjar
Assistant Examiner—Liang-che Wang
(74) Attorney, Agent, or Firm—Schwegman, Lundberg, Woessner & Kluth, P.A.

(57) ABSTRACT

A method for controlling the streaming of voice signals in a local area network is provided. The method includes identifying at least one device to be used in the voice connection among a plurality of devices on the local area network. The method also identifies at least one mode for each of the at least one device to be used in the voice connection. The method sets the at least one mode for the at least one device and streams data over the voice connection based on the at least one mode of the at least one device.

28 Claims, 2 Drawing Sheets

VOICE DATA STREAMING CONTROL IN A NETWORK

TECHNICAL FIELD OF THE INVENTION

The present invention relates generally to the field of telecommunications and, in particular, to control of streaming of signals in a local area network.

BACKGROUND

Conventionally, two distinct networks have been used to carry voice and data. The public switched telephone network (PSTN) is a network that was developed primarily as a network for carrying voice traffic. Similarly, the Internet is a network that was developed primarily to carry data traffic. The PSTN and the Internet conventionally carry data between users at diverse locations. Local networks connected to the PSTN or the Internet are conventionally also dedicated to carrying either voice or data. In a typical office environment, for example, telephones are connected to a private branch exchange (PBX) through one set of wires and computers and other data devices are typically connected to a local area network (LAN), e.g., an Ethernet LAN.

Recently, however, there has been a movement within the telecommunications industry to merge the data and voice networks. This trend has been seen not only in the PSTN and the Internet but also in the local networks, e.g., the PBX and the LAN. With this merger of voice and data traffic, new products have been introduced that allow voice to be transported over a LAN, e.g., voice over Ethernet and voice over IP telephones.

Unfortunately, in these modified or hybrid networks, the only interaction between computing devices and voice devices is that the data to/from the computing devices and voice signals to/from the voice devices are carried over the same infrastructure. These networks make no attempt to merge the capabilities of the data and voice networks. Rather, the voice data is merely transported alongside regular data on the same wires. Further there are no mechanisms for controlling the streaming of voice data in these hybrid networks that would allow the networks to fully utilize the processing power of the computers connected to the local area network to enhance the voice communications by processing the voice streams.

For the reasons stated above, and for other reasons stated below which will become apparent to those skilled in the art upon reading and understanding the present specification, there is a need in the art for a mechanism to control the streaming of voice data in a local area network.

DETAILED DESCRIPTION

The following detailed description refers to the accompanying drawings which form a part of the specification. The drawings show, and the detailed description describes, by way of illustration specific illustrative embodiments in which the invention may be practiced. These embodiments are described in sufficient detail to enable those skilled in the art to practice the invention. Other embodiments may be used and logical, mechanical and electrical changes may be made without departing from the scope of the present invention. The following detailed description is, therefore, not to be taken in a limiting sense.

Figure 1:
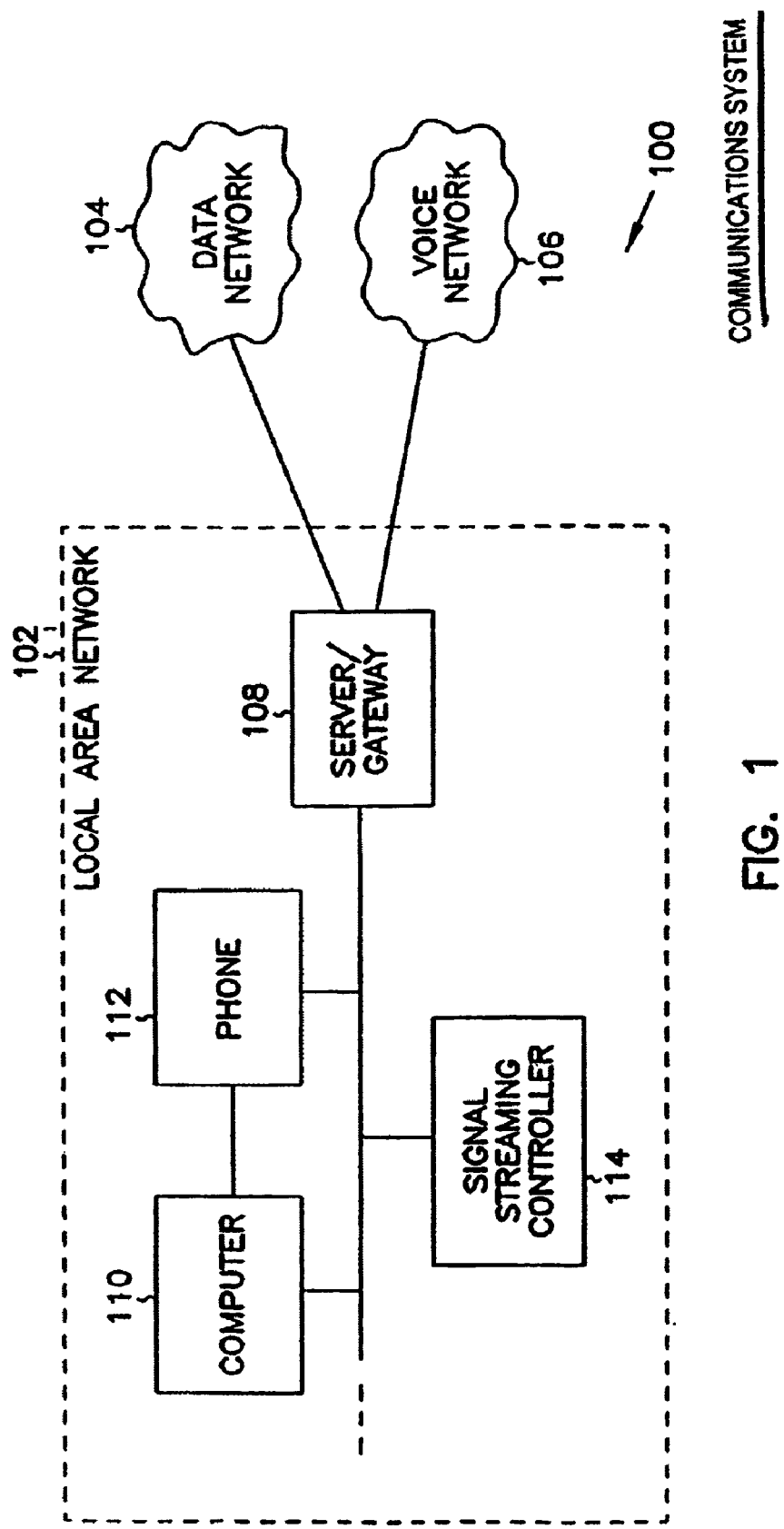
FIG. 1 is a block diagram of an embodiment of a communication system according to the teachings of the present invention.

FIG. 1 is a block diagram of an embodiment of a communications system, indicated generally at 100, including a voice streaming controller 114 constructed according to the teachings of the present invention. System 100 includes a local area network 102 that supports streaming of data, e.g., voice data, to and from a plurality of communication devices. Local area network 102 is coupleable to data network 104, e.g., the Internet, and to voice network 106, e.g., the public switched telephone network. As voice and data networks continue to converge, in some embodiments local area network 102 may be connected to data network 104 or voice network 106 or a single network that carries both voice and data.

Local area network 102 provides a communication network that carries both voice and data over the same network infrastructure. Local area network 102 includes a server/gateway 108 that provides an interface for local area network 102 to data network 104 and voice network 106. In one embodiment, server/gateway 108 comprises a private branch exchange (PBX) with a server attachment. In another embodiment, server/gateway 108 comprises a server with a line card that allows voice signals to be processed by the server.

Server/gateway 108 is also coupled to a number of communication devices such as, for example, computer 110 and phone 112. Server/gateway 108 is also coupled to signal streaming controller 114. In one embodiment, signal streaming controller is a discrete system. In another embodiment, signal streaming controller 114 is a distributed capability performed by a combination of elements in system 100. It is noted that local area network 102 may include any appropriate number and combination of communication devices. The devices shown in FIG. 1 are provided by way of example and not by way of limitation. In one embodiment, phone 112 comprise an Ethernet or IP phone. In one embodiment, phone 112 is coupled to computer 110 exclusively via local area network 102. In another embodiment, phone 112 is coupled to computer 110 through a private connection such as a universal serial bus (USB) connection. In another embodiment, phone 112 is coupled to computer 110 through both local area network 102 and a private connection.

Computer 110 includes one or more application programs that operate on or process voice signals. For example, computer 110 includes software that performs one or more of the following functions: converts voice signals to text, translates text in a first language to text in a second, different language, converts text to voice signals, voice or speech recognition for a voice-activated calendar or other program, or any other appropriate function that accepts voice commands and/or voice data.

When a connection is initiated, signal streaming controller 114 selects source and sink modes of operation for the communication devices involved in the connection, e.g., modes for computer 110, phone 112, and server/gateway 108. The selected modes control the configuration of the communication devices for the communication model that is employed in the connection. For purposes of the specification, the term "connection" includes but is not limited to a stream of voice or other data generated by a communication device such as a telephone, microphone, software program or other appropriate communication device.

Specifically, in one embodiment, signal streaming controller 114 determines if and how each of the communication devices of local area network 102 operates as a sink and/or a source for data for a connection. Signal streaming controller 114 establishes the sink and source modes for each of the communication devices in order to implement the connection. For example, Table 1 below provides a sample of the different sink and source modes of operation for the three communication devices in local area network 102. In this example, local area network 102 includes phone 112, computer 110, and server/gateway 108. Signal streaming controller 114 selects the mode from Table 1 for the communication devices based on the functions to be performed by the communication device. Signal streaming controller 114 notifies the communication devices of the proper mode for the connection.

server/gateway 108. In each embodiment, the communication devices include circuitry or code that recognizes commands from signal streaming controller 114 to switch modes and that recognizes the functionality required for its operation during each mode.

In another embodiment, the functionality of signal streaming controller 114 is provided as program code on a computer readable medium such as a magnetic storage medium, e.g., a diskette, an optically readable medium, e.g., a compact disc, or a memory device.

Figure 2:
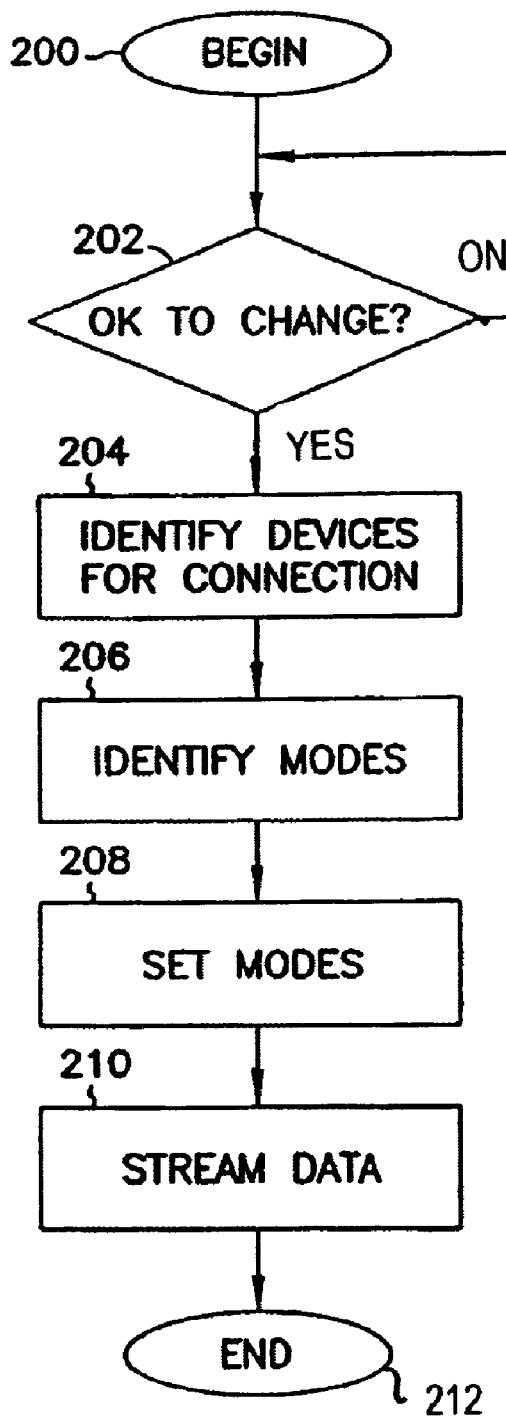
FIG. 2 is a flowchart that illustrates an embodiment of a method for controlling the streaming of voice data in a local area network according to the teachings of the present invention.

FIG. 2 is a flowchart of an embodiment of a process for controlling the streaming of data in a local area network according to the teachings of the present invention. The method of FIG. 2 begins at 200. At block 202, the method determines whether it is acceptable to change the mode of communication devices coupled to a local area network. For example, the method determines whether a locking mechanism has been activated to prevent a communication device

TABLE 1

| | | | SOURCE | | | |
| SINK | Phone 112 | Server/ Gateway 108 | Computer 110 | Phone 112 and Server/Gateway 108 | Server/Gateway 108 and Computer 110 | Phone 112 and Computer 110 |
| --- | --- | --- | --- | --- | --- | --- |
| Phone 112 | X | Mode 1 | Mode 2 | X | Mode 10 | X |
| Server/Gateway 108 | Mode 3 | X | Mode 4 | X | X | Mode 11 |
| Computer 110 | Mode 5 | Mode 6 | X | Mode 12 | X | X |
| Phone 112 and Server/Gateway 108 | X | X | Mode 7 | | | |
| Server/Gateway 108 and Computer 110 | Mode 8 | X | X | | | |
| Phone 112 and Computer 110 | X | Mode 9 | X | | | |

As shown in Table 1, a given communication device acting as a source may provide data to one or more communication devices acting as sinks. Concurrently, a device acting as a source may act as a sink and vice versa. For example, when signal streaming controller 114 receives a control input that indicates a voice stream originating with phone 112 is destined for both server/gateway 108 and computer 110, signal streaming controller 114 instructs phone 112 to function as a source in mode 8 such that server/gateway 108 and computer 110 act as sinks for the voice stream.

In one embodiment, signal streaming controller 114 uses a semaphore to prevent one or more devices from changing modes simultaneously. In one embodiment, signal streaming controller 114 further includes a locking mechanism to prevent changes in the mode of the communication devices before completion of the application or event that drove the previous mode.

For pedagogical purposes, signal streaming controller 114 is shown in FIG. 1 as a separate box on local area network 102. In one embodiment, signal streaming controller 114 is implemented on a server coupled to local area network 102. Signal streaming controller 114 communicates with the other communication devices to select and establish the appropriate modes for the devices for a connection. In another embodiment, signal streaming controller 114 is distributed among the various communication devices. In this case, the communication device that initiates a connection or function transmits signals to the other communication devices in the connection or function to set the proper mode for the connection or function. In another embodiment, signal streaming controller 114 is implemented on from attempting to change the mode of the communication devices coupled to the local area network prior to completion of an application or event that drove the previous modes. Further, in one embodiment, the method determines whether a semaphore has been activated to prevent multiple communication devices from attempting to simultaneously change the mode of communication devices coupled to the local area network.

If at block 202 the method determines that it is not acceptable to change modes, the method returns to block 202. If, however, at block 202 the method determines that it is acceptable to change modes, the method proceeds to block 204. At block 204 the method identifies communication devices to be used in a connection. For example, the method may select from a number of communication devices coupled to the local area network, such as, a computer, a telephone, a server, or any other appropriate communication device.

At block 206, the method identifies the modes for the selected communication devices. For example, in one embodiment, the method uses a table such as Table 1 above to select the appropriate modes for the communication devices. The method further sets the modes for the communication devices by providing signals to each communication device that indicates a next mode for the communication device at block 208. Once the modes for each of the communication devices are set, the method proceeds to stream the data to and from the communication devices at block 210. The method ends at block 212.

EXAMPLES

Signal streaming controller 114 advantageously allows a number of communication devices to interact over local area network 102 to implement a variety of functions. The following provides some examples of the functions that can be implemented in local area network 102. Thus, these examples are provided by way of example and not by way of limitation.

First, signal streaming controller 114 allows computer 110 and phone 112 to provide real time translation of voice data communicated over voice network 106. In this situation, signal streaming controller 114 sets phone 112 in source mode 5 and sink mode 1, and computer 110 in source mode 4 and sink mode 5 such that phone 112 acts as a source for voice data provided to server/gateway 108 via computer 110 for transmission over data network 104 or voice network 106. Computer 110 performs the function of translating the voice data from a first language to a second language. For voice data arriving at server/gateway 108 from the computer 110, server/gateway 108 is placed in sink mode 4. For voice data arriving at server/gateway 108 from an external network, server/gateway 108 is placed in source mode 1 allowing it to provide voice data directly to phone 112. Alternatively, server/gateway 108 is placed in source mode 6 to provide voice data to computer 110 for real-time translation of voice data received from data network 104 or voice network 106 for phone 112.

In another example, signal streaming controller 114 provides dial-in voice interaction with computer 110. Server/gateway 108 is placed in source mode 6 and sink mode 4 to act as a source/sink of voice data for computer 110. Computer 110 is placed in source mode 4 and sink mode 6 to act as a source/sink of voice data for server/gateway 108. This allows computer 110 to be operated remotely based on voice commands exchanged over an external network through server/gateway 108.

In another example, signal streaming controller 114 allows voice input to an agent, e.g., an application running on computer 110, during a phone call. In this example, server/gateway 108 is set in source mode 1 and sink mode 3 to act as a source/sink for voice data to/from phone 112. Phone 112 is set in source mode 8 so as to provide output to computer 110 and to server/gateway 108. Phone 112 is also set in sink mode 10 to allow it to receive voice data from computer 110 and server/gateway 108. Computer 110 is set in sink mode 5 and source mode 2 to allow computer 110 to stream voice/data to/from phone 112. In this manner, a user can use voice to interact with a program, e.g., a calendar program, running on computer 110 while carrying on a conversation on phone 112 over voice network 106 or data network 104.

In another example, signal streaming controller 114 provides voice interaction with a data network, e.g., a website on the Internet. In this example, phone 112 is set in source mode 5 and sink mode 2 to allow voice data to/from computer 110. Computer 110 is set in source mode 2 and sink mode 5 to allow voice data to/from phone 112. Computer 110 includes software that allows voice-activated control of a web browser based on voice signals from phone 112.

CONCLUSION

A mechanism for controlling the streaming of data, e.g., voice streams, in a LAN has been described which selectively assigns source and sink modes for communication devices of a LAN to be used in a connection to allow cooperative functioning of the communication devices during the connection. Advantageously, this control mechanism harnesses the processing power of computers on a LAN to improve and enhance the operation of Ethernet/IP telephones and other communication devices on the LAN.

Although specific embodiments have been illustrated and described herein, it will be appreciated by those of ordinary skill in the art that any arrangement which is calculated to achieve the same purpose may be substituted for the specific embodiment shown. This application is intended to cover any adaptations or variations of the present invention. For example, signal streaming controller 114 can be implemented in software or hardware or a combination of both software and hardware. Further, modes other than the modes shown in Table 1 can be used in a specific application in order to allow a number of communication devices to cooperate in order to coordinate sink and source for a voice stream. Further, although the specification describes a mechanism that works with voice data, it is understood that other kinds of signals, e.g., video, data, or other appropriate signals, could be controlled by the same mechanism.

What is claimed is:

1. A data processing system, comprising:
   a plurality of devices interconnected in a local area network, each of at least three of the devices having
      multiple source modes each identifying at least one other mutually different device of the plurality of devices to receive data from the each device without identifying any of the devices to provide data to the each device, and
      multiple sink modes each identifying at least one other device of the plurality of devices to provide data to the each device without identifying any of the devices to receive data from the each device;
   a streaming controller to select among the multiple source modes and the multiple sink modes independently of each other for any of the at least three devices, so as to establish a data streaming connection among certain of the plurality of devices as identified by the selected source and sink modes, such that, during a time period when the connection exists, at least a first of the three devices is adapted to provide data to a second of the devices in the plurality without providing data to a third device in the plurality, and is adapted to receive data from the third device without receiving data from the second device.

2. The system of claim 1 where at least one of the source modes for at least one of the at least three devices identifies multiple ones of the plurality of devices to receive streaming data from the each device.

3. The system of claim 1 where at least one of the sink modes for at least one of the at least three devices identifies multiple ones of the plurality of devices to provide data to the each device.

4. The system of claim 1 where the at least three devices include a telephone, a computer to perform a data processing function upon the streaming data, and a gateway to an external network.

5. The system of claim 4 where the computer includes a source mode (4) identifying the gateway to receive data from the telephone and a sink mode (5) identifying the telephone to provide data to the computer.

6. The system of claim 5 where the telephone includes a source mode (5) identifying the computer to receive data from the telephone and a sink mode (1) identifying the gateway to provide data to the telephone.

7. The system of claim 5 where the gateway includes a source mode identifying the telephone to receive data from the gateway and a sink mode identifying the computer to provide data to the gateway.

8. The system of claim 4 where the telephone includes a source mode identifying both the computer and the gateway to receive data from the telephone and a sink mode identifying both the computer and the gateway to provide data to the telephone.

9. The system of claim 8 where the computer includes a source mode (2) identifying the telephone only to receive data from the computer and a sink mode (5) identifying the telephone only to provide data to the telephone.

10. The system of claim 8 where the gateway includes a source mode (1) identifying the telephone only to receive data from the computer and a sink mode (3) identifying the telephone only to provide data to the telephone.

11. The system of claim 1 where the streaming controller is distributed among multiple ones of the devices.

12. The system of claim 1 where the streaming controller is implemented as a discrete unit.

13. The system of claim 1 where the controller is adapted to lock the mode of at least one of the plurality of devices.

14. The system of claim 1 where the controller includes a semaphore to prevent multiple ones of the plurality of devices from simultaneously changing modes.

15. A method, comprising:
for each of at least three devices in a plurality of devices interconnected in a local area network, defining
multiple source modes each identifying at least one other mutually different device of the plurality of devices to receive data from the each device without identifying any of the devices to provide data to the each device;
multiple sink modes each identifying at least one other device of the plurality of devices to provide data to the each device without identifying any of the devices to receive data from the each device;
selecting among the multiple source modes and the multiple sink modes independently of each other for any of the at least three devices;
establishing a data streaming connection among certain of the plurality of devices as identified by the selected source and sink modes, such that, during a time period when the connection exists, at least a first of the three devices is adapted to provide data to a second of the devices in the plurality without providing data to a third device in the plurality, and is adapted to receive data from the third device without receiving data from the second device.

16. The method of claim 15 where at least one of the source nodes for at least one of the at least three devices identifies multiple ones of the plurality of devices to receive data from the each device.

17. The method of claim 15 where at least one of the sink nodes for at least one of the at least three devices identifies multiple ones of the plurality of devices to provide data to the each device.

18. The method of claim 15 where the streaming data is voice data.

19. The method of claim 15 where at least one of the devices in the at least three devices sends and receives the streaming data to and from an external network.

20. The method of claim 15 where at least one of the devices in the at least three devices performs a processing function upon the streaming data.

21. The method of claim 20 where the processing function includes one or more of the group comprising
converting voice data to text data,
converting text data to voice data,
translating data to a different language,
recognizing voice data,
executing voice commands.

22. The method of claim 15 further comprising communicating streaming data among the certain devices.

23. The method of claim 22 further comprising locking the mode of at least one of the plurality of devices during the communication.

24. The method of claim 22 further comprising preventing multiple ones of the plurality of devices from simultaneously changing modes.

25. A computer readable medium having instructions stored thereon to perform a method comprising:
for each of at least three devices in a plurality of devices interconnected in a local area network, defining
multiple source modes each identifying at least one other mutually different device of the plurality of devices to receive data from the each device without identifying any of the devices to provide data to the each device;
multiple sink modes each identifying at least one other device of the plurality of devices to provide data to the each device without identifying any of the devices to receive data from the each device;
selecting among the multiple source modes and the multiple sink modes independently of each other for any of the at least three devices;
establishing a data streaming connection among certain of the plurality of devices as identified by the selected source and sink modes, such that, during a time period when the connection exists, at least a first of the three devices is adapted to provide data to a second of the devices in the plurality without providing data to a third device in the plurality, and is adapted to receive data from the third device without receiving data from the second device.

26. The medium of claim 25 where at least one of the source nodes for at least one of the at least three devices identifies multiple ones of the plurality of devices to receive data from the each device.

27. The medium of claim 25 where at least one of the sink nodes for at least one of the at least three devices identifies multiple ones of the plurality of devices to provide data to the each device.

28. The medium of claim 25 where at least one of the devices in the at least three devices performs a processing function upon the streaming data.

* * * * *